(12) United States Patent
Okamoto (10) Patent No.: US 11,397,850 B2
(45) Date of Patent: Jul. 26, 2022

(54) INFORMATION PROCESSING APPARATUS AND NON-TRANSITORY COMPUTER READABLE MEDIUM FOR ARRANGING AND DISPLAYING IMAGES REPRESENTING DATA IN ACCORDANCE WITH A CHRONOLOGICAL ORDER REPRESENTED BY AN OPERATION HISTORY

(71) Applicant: FUJIFILM BUSINESS INNOVATION CORP., Tokyo (JP)

(72) Inventor: Takuya Okamoto, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/030,477

(22) Filed: Sep. 24, 2020

(65) Prior Publication Data
US 2021/0224473 A1  Jul. 22, 2021

(30) Foreign Application Priority Data

Jan. 20, 2020  (JP) .............................. JP2020-007033

(51) Int. Cl.
| | | |
|---|---|---|
| *G06F 17/00* | (2019.01) | |
| *G06F 40/186* | (2020.01) | |
| *G06F 40/169* | (2020.01) | |
| *G06F 16/93* | (2019.01) | |
| *G06F 40/197* | (2020.01) | |
| *G06F 40/106* | (2020.01) | |
| *G06F 16/58* | (2019.01) | |

(52) U.S. Cl.
CPC ............ *G06F 40/186* (2020.01); *G06F 16/58* (2019.01); *G06F 16/93* (2019.01); *G06F 40/106* (2020.01); *G06F 40/169* (2020.01); *G06F 40/197* (2020.01)

(58) Field of Classification Search
None
See application file for complete search history.

(56) References Cited

U.S. PATENT DOCUMENTS

| | | | |
|---|---|---|---|
| 2002/0077930 A1* | 6/2002 | Trubey | G06Q 30/0643 705/27.2 |
| 2006/0080616 A1* | 4/2006 | Vogel | G06F 9/451 715/769 |
| 2008/0034307 A1* | 2/2008 | Cisler | G06F 3/04815 715/764 |
| 2008/0228732 A1* | 9/2008 | Morisawa | G06F 16/156 |
| 2011/0035274 A1* | 2/2011 | Goel | G06Q 30/04 705/14.45 |
| 2011/0252301 A1* | 10/2011 | Vollmer | G06F 16/904 715/229 |
| 2014/0250411 A1* | 9/2014 | Gilra | G06F 3/04842 715/811 |
| 2017/0180808 A1* | 6/2017 | Kageyama | H04N 21/4751 |
| 2018/0007217 A1* | 1/2018 | Yoshihama | H04N 1/2166 |
| 2018/0101902 A1* | 4/2018 | Gandhi | G06Q 40/02 |
| 2020/0125671 A1* | 4/2020 | Li | G06F 40/20 |

FOREIGN PATENT DOCUMENTS

JP   2018-160263 A   10/2018

* cited by examiner

*Primary Examiner* — Mustafa A Amin
(74) *Attorney, Agent, or Firm* — Oliff PLC (57) ABSTRACT

An information processing apparatus includes a processor configured to acquire operation history of data, which is used in a target operation. The processor is further configured to arrange and display images, which represent the data, in a chronological order according to the operation history.

13 Claims, 7 Drawing Sheets

| DISPLAY DATE AND TIME | EDITING DATE AND TIME | DATA ID | EDITING HISTORY | DISPLAY DURATION | DATA |
|---|---|---|---|---|---|
| 12/01/2019 10:00 | - | BUSINESS TRIP APPLICATION FORM TEMPLATE | - | ⋮ |  |
| 12/01/2019 10:02 | - | BUSINESS TRIP APPLICATION FORM IN FIRST FORMAT | - | ⋮ | - |
| 12/01/2019 10:03 | - | BUSINESS TRIP APPLICATION FORM MANUAL | - | PAGE 1: 5 SECONDS PAGE 10: 10 SECONDS ⋮ |  |
| 12/01/2019 10:05 | - | CALCULATION OF TRANSPORT COST | - | ⋮ |  |
| - | 12/01/2019 10:05 | BUSINESS TRIP APPLICATION FORM IN FIRST FORMAT | ENTRY OF INFORMATION | ⋮ |  |
| - | 12/01/2019 10:06 | BUSINESS TRIP APPLICATION FORM IN SECOND FORMAT | ADDITION OF ELECTRONIC STICKY NOTE | ⋮ | - |
| - | 12/01/2019 10:07 | BUSINESS TRIP APPLICATION FORM IN SECOND FORMAT | ATTACHMENT OF ELECTRONIC SEAL | ⋮ |  |

ION PROCESSING APPARATUS AND NON-TRANSITORY COMPUTER READABLE MEDIUM FOR ARRANGING AND DISPLAYING IMAGES REPRESENTING DATA IN ACCORDANCE WITH A CHRONOLOGICAL ORDER REPRESENTED BY AN OPERATION HISTORY

CROSS-REFERENCE TO RELATED APPLICATIONS

This application is based on and claims priority under 35 USC 119 from Japanese Patent Application No. 2020-007033 filed Jan. 20, 2020.

BACKGROUND (i) Technical Field

The present disclosure relates to an information processing apparatus and a non-transitory computer readable medium.

(ii) Related Art

Techniques for displaying history regarding editing of data have been available. For example, a technique for displaying a list of histories of setting information set on a setting screen and used for editing of an image, along with a thumbnail image of an image reflecting contents of editing based on the setting information, is described, for example, in Japanese Unexamined Patent Application Publication No. 2018-160263.

SUMMARY

When performing an operation, for example, a user may browse data describing an operation procedure or edit a template so that a document regarding the operation may be created. However, when performing such an operation again, the user may not remember what procedure was used for data.

Aspects of non-limiting embodiments of the present disclosure relate to being able to recognize data that the user used when the user previously performed a target operation and a procedure for using the data.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to acquire operation history of data used in a target operation, and arrange and display images representing the data in accordance with a chronological order represented by the operation history on a display.

BRIEF DESCRIPTION OF THE DRAWINGS

Exemplary embodiments of the present disclosure will be described in detail based on the following figures, wherein.

DETAILED DESCRIPTION

1. Configuration

Figure 1:
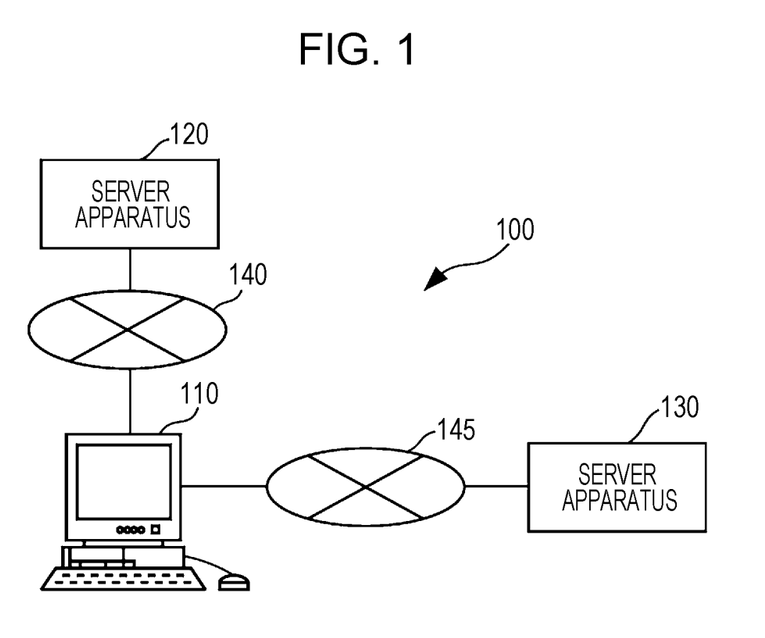
FIG. 1 is a diagram illustrating an example of the configuration of a task support system according to an exemplary embodiment.

FIG. 1 is a diagram illustrating an example of the configuration of a task support system 100 according to an exemplary embodiment of the present disclosure. The task support system 100 is a system that supports a task by a user. The task support system 100 provides data to be used for a task by a user. The task support system 100 includes a client apparatus 110 and server apparatuses 120 and 130. The client apparatus 110 is an example of an information processing apparatus according to an exemplary embodiment of the present disclosure. The client apparatus 110 and the server apparatus 120 are connected to each other via a communication line 140. The communication line 140 is, for example, the Internet. The client apparatus 110 and the server apparatus 130 are connected via a communication line 145. The communication line 145 is, for example, an intranet.

The user performs a task using various data. The various data include data provided from the server apparatus 120 or 130. The server apparatuses 120 and 130 each provide data to be used for a task by a user to the client apparatus 110. The server apparatuses 120 and 130 function as, for example, web servers and provide web pages to the client apparatus 110. The web pages include, for example, a web page of a template of a document to be created in a task by the user and a web page for supporting a task.

The client apparatus 110 is used by the user. The user performs a task using the client apparatus 110. History of operation on data used in the task by the user is stored in the client apparatus 110. When the user performs the task next time, images representing the data used in the last task are displayed in a chronological order on the client apparatus 110 in accordance with the history. By viewing the images, the user understands the data that the user used when the user performed the last task and the order in which the user used the data.

Figure 2:
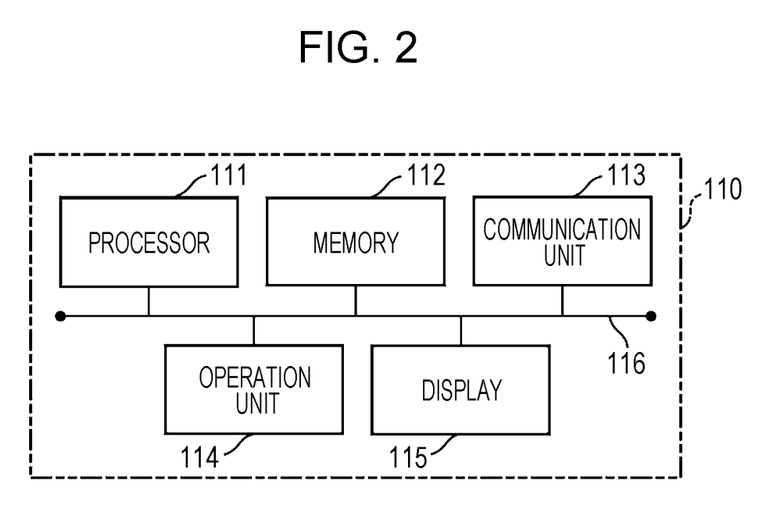
FIG. 2 is a diagram illustrating an example of the configuration of a client apparatus.

FIG. 2 is a diagram illustrating an example of the configuration of the client apparatus 110. The client apparatus 110 includes a processor 111, a memory 112, a communication unit 113, an operation unit 114, and a display 115. The processor 111, the memory 112, the communication unit 113, the operation unit 114, and the display 115 are connected to one another via a bus 116.

The processor 111 executes a program to control the individual units of the client apparatus 110 or perform various types of processing. The processor 111 is, for example, a central processing unit (CPU). A program to be executed by the processor 111 is stored in the memory 112.

The memory 112 includes, for example, a read only memory (ROM), a random access memory (RAM), and hard disk or solid state drive (SSD). An operating system, document management software, a web browser, and operation history 117 are stored in the memory 112. The communication unit 113 performs data communication with external apparatuses connected via the communication line 140 or 145. The operation unit 114 is used by the user operating the client apparatus 110. The operation unit 114 includes, for example, a keyboard and a mouse. Various types of information are displayed on the display 115. The display 115 is, for example, a liquid crystal display.

Figure 3:
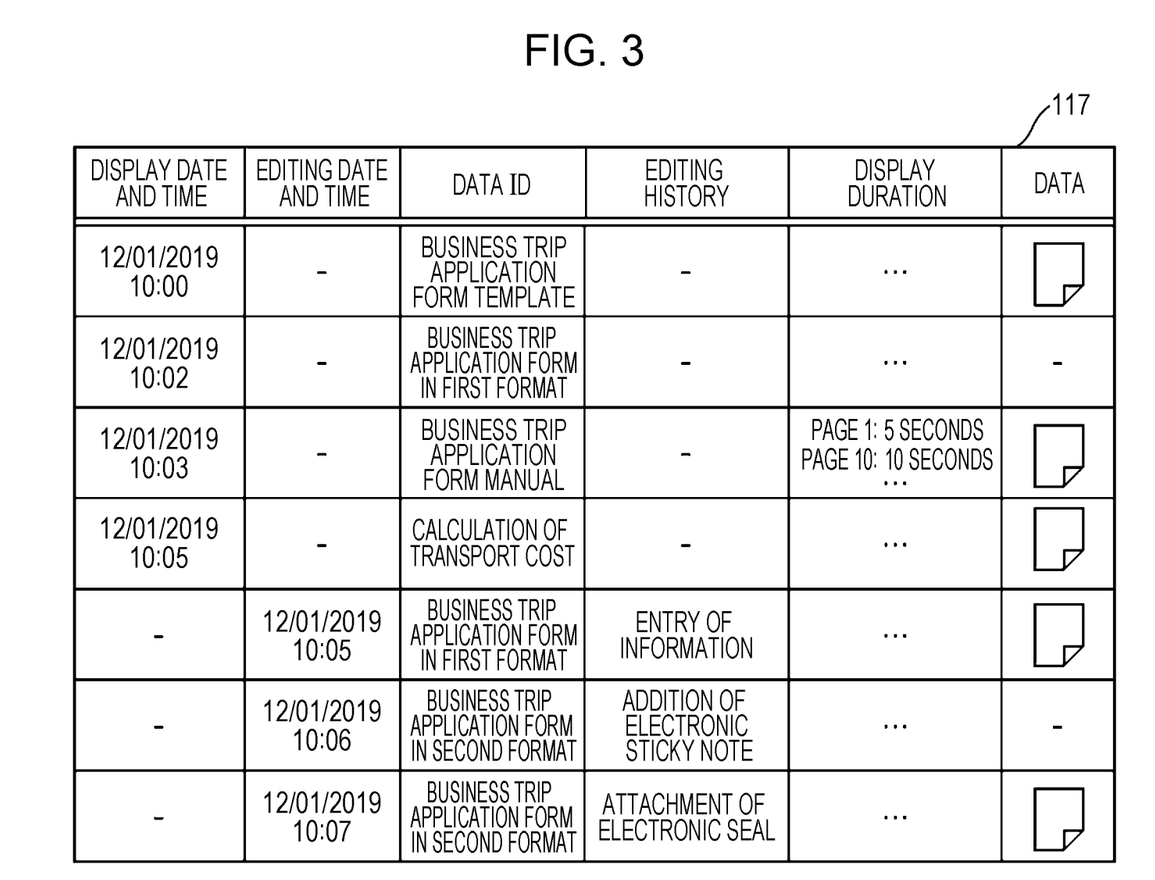
FIG. 3 is a diagram illustrating an example of operation history.

FIG. 3 is a diagram illustrating an example of the operation history 117. The operation history 117 represents history of operation on data used for a task. The operation history 117 includes a display date and time, an editing date and time, a data ID, an editing history, a display duration, and data. The display date and time represents the date and time at which the data was displayed. The display date and time may be, for example, the date and time at which a file was opened. The editing date and time represents the date and time at which the data was edited. The data ID represents information for uniquely identifying the data. The editing history represents history of editing of the data. The display duration represents the duration during which the data was displayed. The display duration is, for example, the duration during which a screen representing the data was displayed on the foremost screen. The data represents the data used in the task. The data may be the entity of a file used in the task or image data obtained by capturing a screen representing the data. In the case where a plurality of operations are performed for a piece of data, data obtained by the last operation may be used.

Every time that the user performs a task using data, new operation history 117 is generated. For example, history of all the operations is recorded in the client apparatus 110. For a web page, the display date and time and the display duration are recorded by a web browser. For data of the client apparatus 110, the display date and time and the editing date and time are recorded by the operating system. For data in a format corresponding to the document management software out of data of the client apparatus 110, editing history is recorded by the document management software. The user performs, using the operation unit 114, an operation for specifying, out of history of all the operations recorded in the client apparatus 110, an operation on the first data used in a task and an operation on the last data used in the task. Then, a new operation history 117 is generated on the basis of the two operations specified by the user and history of operations performed between the two operations.

Hereinafter, an example in which the user performs a business trip application task for applying for a business trip will be explained. For the business trip application task, the user first inputs basic information including the name, employee number, destination, and purpose to a business trip application form template downloaded from the server apparatus 120. The example illustrated in FIG. 3 indicates that a web page of a business trip application form template was displayed at 10:00 am on Dec. 1, 2019 and a business trip application form in a first format was subsequently displayed at 10:02 am on Dec. 1, 2019. Then, the user refers to a business trip application form manual so that questions arising during input to the business trip application form may be sorted out. The example illustrated in FIG. 3 indicates that the business trip application form manual was displayed at 10:03 am on Dec. 1, 2019. The business trip application form manual contains a plurality of pages. The example illustrated in FIG. 3 indicates that the first page was displayed for five seconds and the tenth page was displayed for ten seconds. Then, the user calculates transport cost according to a company policy, using a web page provided by the server apparatus 130 for calculation of transport cost. The example illustrated in FIG. 3 indicates that the web page for calculation of transport cost was displayed at 10:05 am on Dec. 1, 2019.

Then, the user inputs information obtained by the calculation of transport cost to the business trip application form. The example illustrated in FIG. 3 indicates that information was input to the business trip application form in the first format at 10:05 am on Dec. 1, 2019. Then, the user converts the file format of the business trip application form from the first format to a second format. The first format is, for example, a format that does not support addition of an electronic sticky note or attachment of an electronic seal. In contrast, the second format is, for example, a format that supports addition of an electronic sticky note or attachment of an electronic seal. The second format is a format supported by the document management software. Then, the user adds an electronic sticky note indicating a message item for an approver and attaches an electronic seal indicating the date to the business trip application form in the converted file format. The example illustrated in FIG. 3 indicates that an electronic sticky note was added to the business trip application form in the second format at 10:06 am on Dec. 1, 2019 and an electronic seal was attached to the business trip application form in the second format at 10:07 am on Dec. 1, 2019.

As described above, in the example illustrated in FIG. 3, the user performs the business trip application task, using the web page of the business trip application form template, the business trip application form in the first format, the business trip application form manual, the web page for calculation of transport cost, and the business trip application form in the second format. Of the above data, the business trip application form in the first format and the business trip application form in the second format are edited in the task and thus correspond to examples of first data according to an exemplary embodiment of the present disclosure. In contrast, the web page of the business trip application form template, the business trip application form manual, and the web page for calculation of transport cost are displayed without being edited in the task and thus correspond to examples of second data according to an exemplary embodiment of the present disclosure.

2. Operation

Hereinafter, in the case where the processor 111 is described as a subject of a process, the process is performed by the processor 111 performing calculation or controlling operation of other hardware elements in cooperation between the program stored in the memory 112 and the processor 111 executing the program.

Figure 4:
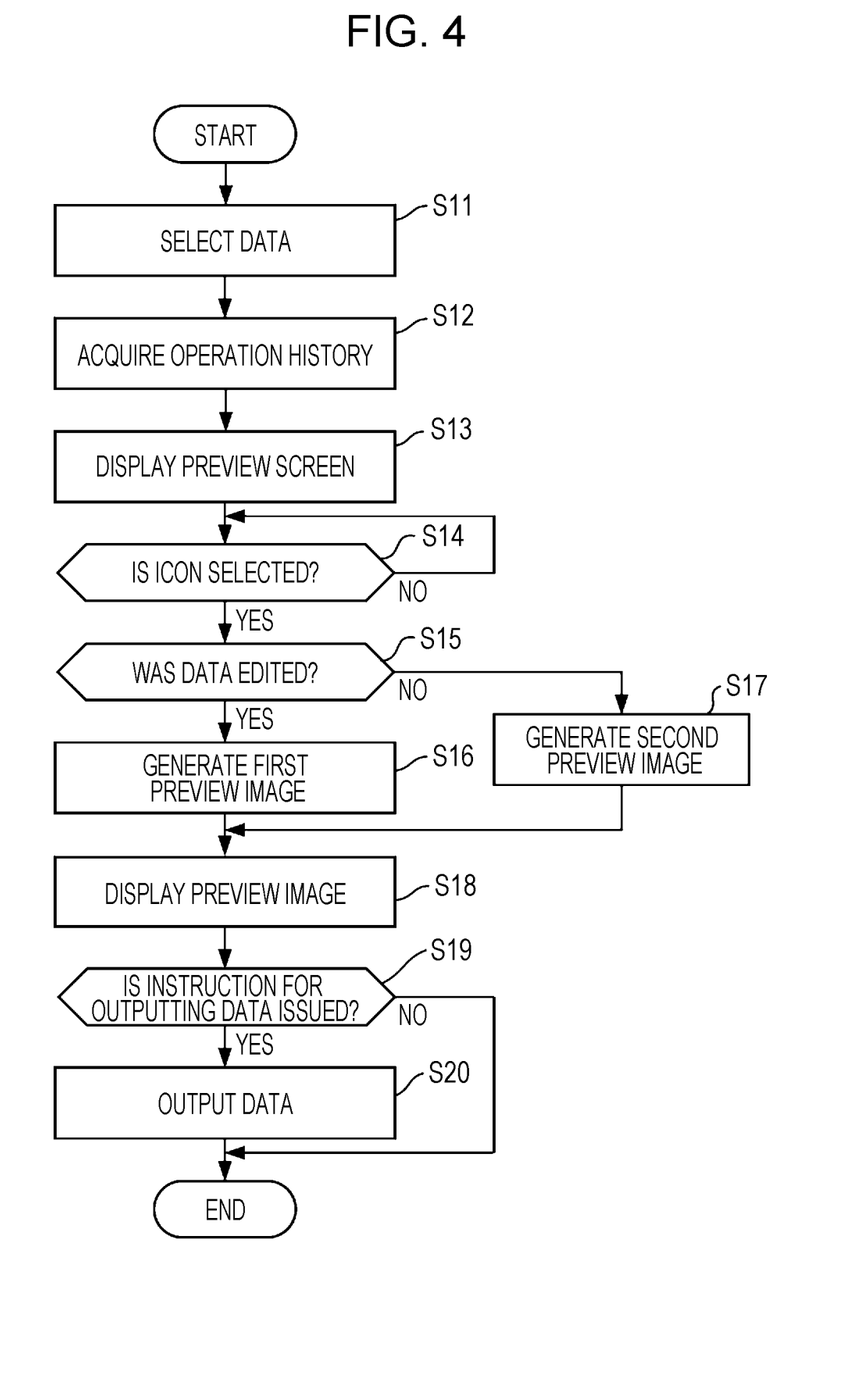
FIG. 4 is a flowchart illustrating an example of an operation of the client apparatus.

FIG. 4 is a flowchart illustrating an example of an operation of the client apparatus 110. This operation is performed, for example, when the user performs a task that the user has done before again.

Figure 5:
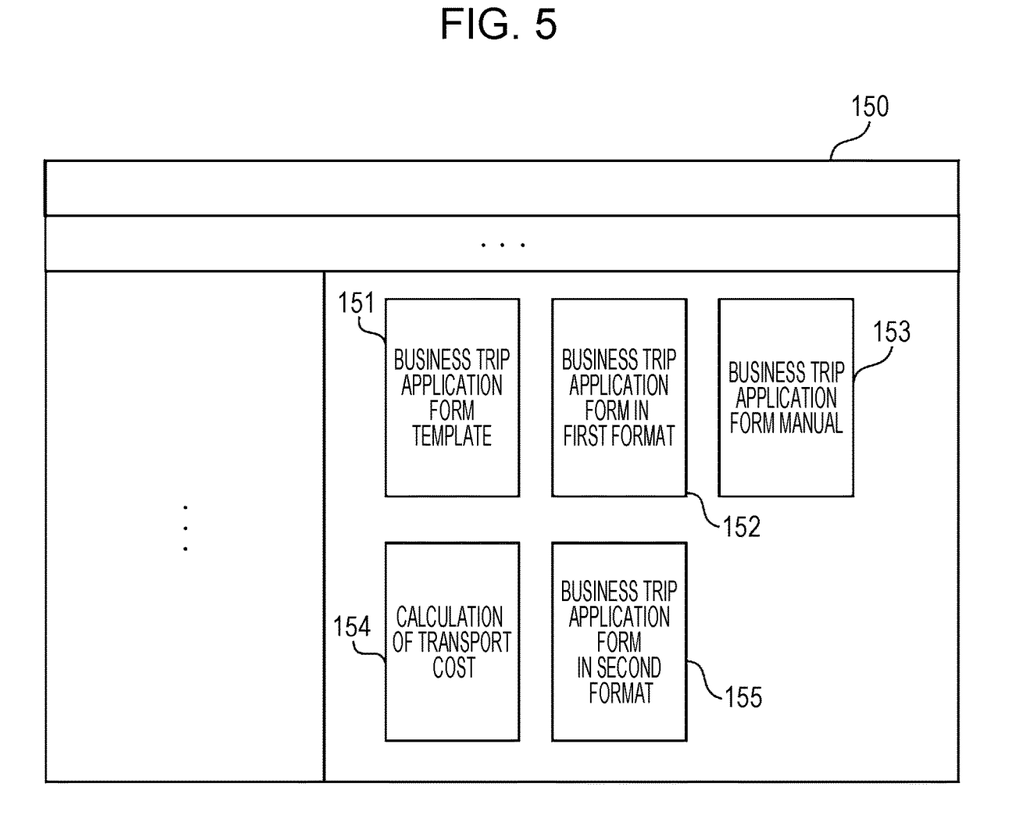
FIG. 5 is a diagram illustrating an example of a selection screen.

In step S11, the processor 111 selects desired data, out of data that the user used in the last target task, on the basis of the operation history 117. For example, when the user performs, using the operation unit 114, an operation for specifying the target task, a selection screen 150 is displayed on the display 115. In this example, the target task is a business trip application task for applying for a business trip.

The business trip application task is an example of a target operation according to an exemplary embodiment of the present disclosure. The selection screen 150 is used for an operation for selecting data that the user used in the last target task. The data selected on the selection screen 150 is a display target. For example, data representing a document that has not been edited or data representing a web page whose display duration is short may not be selected. In this case, such data is excluded from the display target.

FIG. 5 is a diagram illustrating an example of the selection screen 150. The selection screen 150 contains thumbnail images 151 to 155 of data that the user used when the user performed the last business trip application task. The thumbnail images 151 to 155 represent the web page of the business trip application form template, the business trip application form in the first format, the business trip application form manual, the web page for calculation of transport cost, and the business trip application form in the second format. The user performs an operation for selecting data of the display target on the selection screen 150. For example, in the case where all the web page of the business trip application form template, the business trip application form in the first format, the business trip application form manual, the web page for calculation of transport cost, and the business trip application form in the second format are display targets, the user performs, using the operation unit 114, an operation for selecting the thumbnail images 151 to 155.

In step S12, the processor 111 acquires the operation history 117 of the data selected in step S11. For example, in the case where all the data that the user used in the last business trip application task are selected in step S11, the operation history 117 illustrated in FIG. 3 is read from the memory 112.

Figure 6:
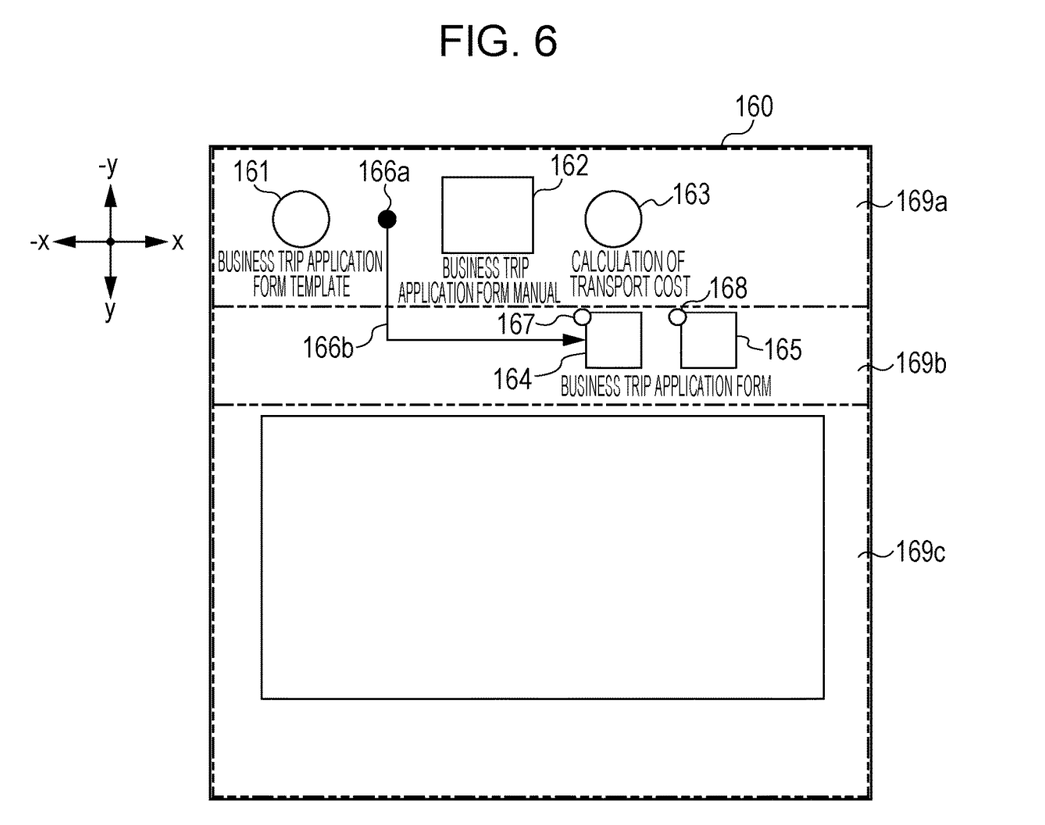
FIG. 6 is a diagram illustrating an example of a preview screen.

In step S13, the processor 111 causes a preview screen 160 to be displayed on the display 115 in accordance with the operation history 117. The preview screen 160 contains icons representing data used in the last target task. The icons are arranged in chronological order in accordance with the operation history 117.

FIG. 6 is a diagram illustrating an example of the preview screen 160. The preview screen 160 is divided into regions 169a to 169c along an X-axis direction. The region 169a is located at the end in a negative y-axis direction. The region 169c is located at the end in a y-axis direction. The region 169b is located between the regions 169a and 169c.

The operation history 117 illustrated in FIG. 3 indicates that the web page of the business trip application form template, the business trip application form manual, the web page for calculation of transport cost, the business trip application form in the first format, and the business trip application form in the second format were used in the last business trip application task. In this case, the preview screen 160 contains an icon 161 representing the web page of the business trip application form template, an icon 162 representing the business trip application form manual, an icon 163 representing the web page for calculation of transport cost, an icon 164 representing the business trip application form in the first format, and an icon 165 representing the business trip application form in the second format.

File names of corresponding data are displayed close to the icons 161 o 165. A file name represents a name for uniquely identifying data. The file name does not include an extension. Although the extension of the business trip application form in the first format represented by the icon 164 and the extension of the business trip application form in the second format represented by the icon 165 are different, the file name of both the data is "business trip application form". Furthermore, the icon 164 and the icon 165 are arranged adjacent to each other. In this case, instead of displaying the file name "business trip application form" at each of a position close to the icon 164 and a position close to the icon 165, the file name "business trip application form" is displayed only at a position close to both the icon 164 and the icon 165.

On the preview screen 160, the icons 161 to 163 representing data that were displayed but were not edited in the last business trip application task and the icons 164 and 165 representing data that were edited in the last business trip application task are displayed in different regions. The operation history 117 illustrated in FIG. 3 indicates that the web page of the business trip application form template, the business trip application form manual, and the web page for calculation of transport cost were displayed without being edited in the last business trip application task. The operation history 117 illustrated in FIG. 3 also indicates that the business trip application form in the first format and the business trip application form in the second format were edited in the last business trip application task. In this case, as illustrated in FIG. 6, the icons 161 to 163 representing the web page of the business trip application form template, the business trip application form manual, and the web page for calculation of transport cost are displayed in the region 169a. The icons 161 to 163 are examples of a second image according to an exemplary embodiment of the present disclosure. In contrast, the icons 164 and 165 representing the business trip application form in the first format and the business trip application form in the second format are displayed in the region 169b. The icons 164 and 165 are examples of a first image according to an exemplary embodiment of the present disclosure. As illustrated in FIG. 6, the icons 161 to 163 and the icons 164 and 165 are arranged along different lines extending in the x-axis direction.

In the region 169a, the icons 161 to 163 are arranged and displayed in an order corresponding to the display date and time of the web page of the business trip application form template, the business trip application form manual, and the web page for calculation of transport cost. The operation history 117 illustrated in FIG. 3 indicates that the display date and time of the web page of the business trip application form template is 10:00 am on Dec. 1, 2019, the display date and time of the business trip application form manual is 10:03 am on Dec. 1, 2019, and the display date and time of the web page for calculation of transport cost is 10:05 am on Dec. 1, 2019. In this case, as illustrated in FIG. 6, the icons 161, 162, and 163 are arranged in this order along the x-axis direction from the end of a negative x-axis direction. Regarding the icons 161 to 163, the older the display date and time of data, the closer to the end of the negative x-axis direction the position of an icon corresponding to the data. In other words, regarding the icons 161 to 163, the newer the display date and time of data, the closer to the end of the x-axis direction the position of an icon corresponding to the data. Furthermore, the operation history 117 illustrated in FIG. 3 indicates that the display date and time of the business trip application form in the first format is 10:02 am on Dec. 1, 2019. In this case, as illustrated in FIG. 6, a mark 166a representing the business trip application form in the first format is arranged between the icon 161 and the icon 162.

In the region 169b, the icons 164 and 165 are arranged and displayed in an order corresponding to the editing date and time of the business trip application form in the first format and the business trip application form in the second format. The operation history 117 illustrated in FIG. 3 indicates that the editing date and time of the business trip application form in the first format is 10:05 am on Dec. 1, 2019 and the editing date and time of the business trip application form in the second format is 10:06 on Dec. 1, 2019 and 10:07 am on Dec. 1, 2019. In this case, as illustrated in FIG. 6, the icons 164 and 165 are arranged in this order along the x-axis direction from the end of the negative x-axis direction. Regarding the icons 164 and 165, the older the editing date and time of data, the closer to the end of the negative x-axis direction the position of an icon corresponding to the data. In other words, regarding the icons 164 and 165, the newer the editing date and time of data, the closer to the end of the x-axis direction the position of an icon corresponding to the data. Furthermore, regarding the business trip application form in the first format whose display date and time and editing date and time are different, a mark 166b that extends from the mark 166a toward the icon 164 is displayed, as illustrated in FIG. 6. By viewing the mark 166b, the user is able to understand the relationship between the display date and time and the editing date and time of the business trip application form in the first format.

Furthermore, the icons 164 and 165 represent data that were edited in the last business trip application task and are thus displayed in a manner distinguished from the icons 161 to 163 representing data that were displayed but were not edited in the last business trip application task. As illustrated in FIG. 6, additional images 167 and 168 representing that icons correspond to edited data are added to the icons 164 and 165, respectively. In contrast, no additional images are added to the icons 161 to 163. With the addition of the additional images 167 and 168, the user is able to understand data that were edited in the last business trip application task.

By viewing the icons 161 to 165, the user is able to understand that the user used the web page of the business trip application form template, the business trip application form manual, the web page for calculation of transport cost, the business trip application form in the first format, and the business trip application form in the second format in the last business trip application task. Furthermore, the user is able to understand that the user browsed the web page of the business trip application form template, the business trip application form manual, and the web page for calculation of transport cost in this order in the last business trip application task. Moreover, the user is able to understand that the user displayed the business trip application form in the first format after browsing the web page of the business trip application form template and then edited the business trip application form in the first format and the business trip application form in the second format in this order while browsing the business trip application form manual and the web page for calculation of transport cost. Thus, the user is able to understand in which order the user might want to use data in the current business trip application task.

In step S14, the processor 111 determines whether or not any one of the icons 161 to 165 has been selected. In the case where none of the icons 161 to 165 has been selected, the result of the determination in step S14 is NO, and the processing of step S14 is repeatedly performed. In contrast, for example, in the case where any one of the icons 161 to 165 has been selected by the user using the operation unit 114, the result of the determination in step S14 is YES, and the process proceeds to step S15.

In step S15, the processor 111 determines whether or not data corresponding to the icon selected in step S14 was edited in the last target task. For example, in the case where an operation for selecting the icon 165 is performed on the preview screen 160 illustrated in FIG. 6, because the business trip application form in the second format corresponding to the icon 165 was edited in the last business trip application task as described above, the result of the determination in step S15 is YES. In this case, the process proceeds to step S16.

In step S16, the processor 111 generates a first preview image of data corresponding to the icon selected in step S14. The first preview image is an image representing data obtained by editing in the last target task. An additional image is added to an edited part of the first preview image on which editing was made in the last target task.

Figure 7:
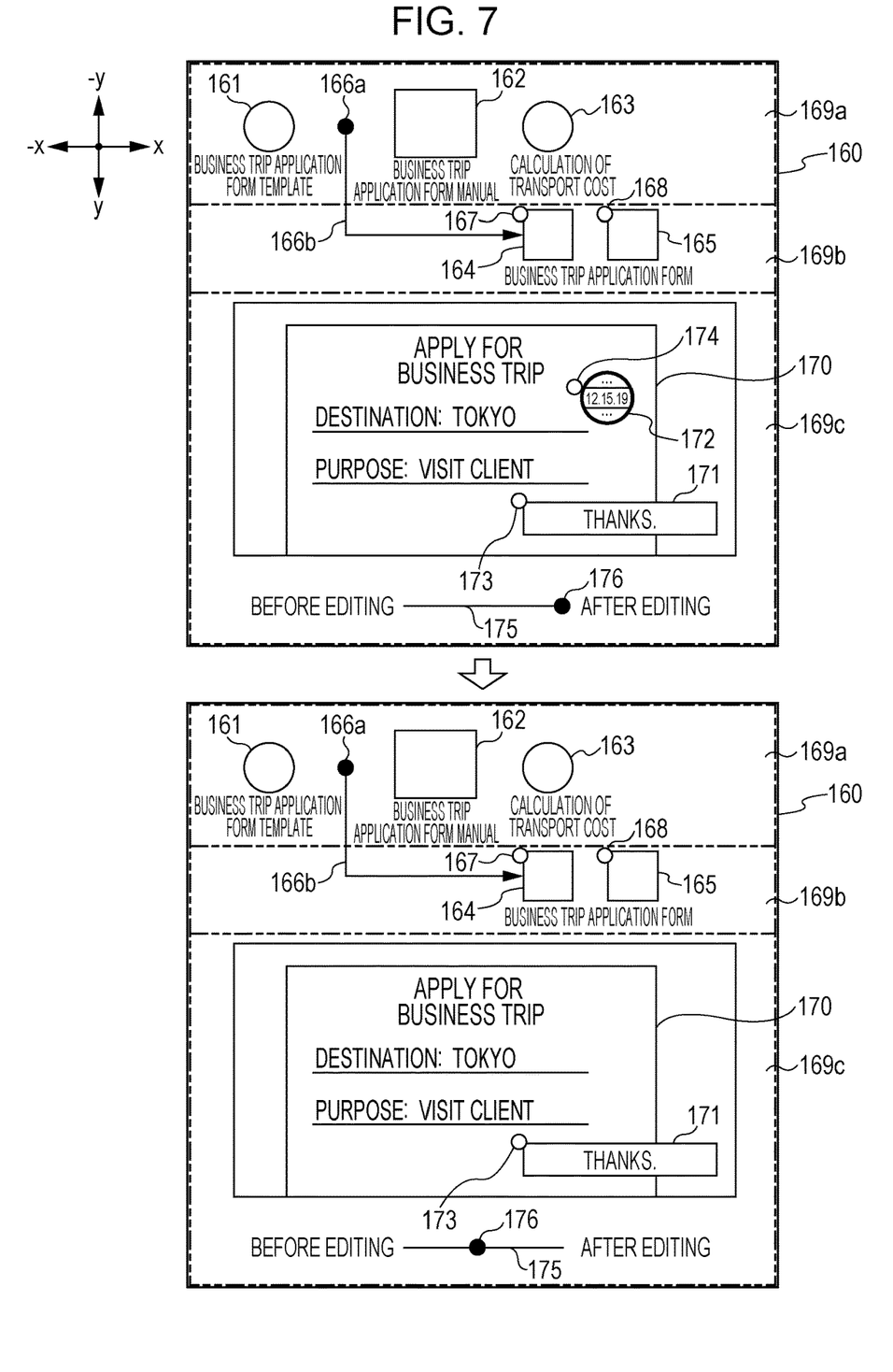
FIG. 7 is a diagram illustrating an example of a preview image of a business trip application form in a second format.

In this example, it is assumed that the icon 165 representing the business trip application form in the second format is selected. In this case, a preview image 170 representing the business trip application form in the second format is generated. The operation history 117 illustrated in FIG. 3 indicates that an electronic sticky note 171 representing a message item for an approver was added and then an electronic seal 172 representing date was attached to the business trip application form in the second format in the last business trip application task. In this case, the electronic sticky note 171 is added and the electronic seal 172 is attached to the preview image 170. In the preview image 170, an additional image 173 is added to a part to which the electronic sticky note 171 was added, and an additional image 173 is added to a part to which the electronic seal 172 was attached.

In step S18, the processor 111 causes the preview image generated in step S16 or S17 to be displayed on the preview screen 160. For example, in the case where the preview image 170 of the business trip application form in the second format is generated in step S16, the preview image 170 is displayed on the preview screen 160.

FIG. 7 is a diagram illustrating an example of the preview image 170 of the business trip application form in the second format. The preview image 170 is displayed in the region 169c of the preview screen 160. As described above, the preview image 170 represents the business trip application form in the second format obtained by editing in the last business trip application task. The electronic sticky note 171 is added and the electronic seal 172 is attached to the preview image 170. The additional image 173 is added to a part to which the electronic sticky note 171 is added, and an additional image 174 is added to a part to which the electronic seal 172 is attached. By viewing the additional images 173 and 174, the user is able to understand the parts on which editing was made in the last business trip application task.

Furthermore, an operation image 175 to be used for an operation for specifying a reference point in time included in a period during which editing is performed is displayed, along with the preview image 170, in the region 169c. When the user performs an operation for specifying a reference point in time, the preview image 170 is changed such that a part on which editing was made after the reference point in time returns to a state before being edited. The operation image 175 is, for example, a slider bar. The end of the operation image 175 in the negative x-axis direction represents a state before being edited, and the end of the operation image 175 in the x-axis direction represents a state after being edited. The operation image 175 includes a slider 176. As described above, the electronic sticky note 171 was added and the electronic seal 172 was then attached to the business trip application form in the second format in the last business trip application task. As illustrated in FIG. 7, when the user performs, using the operation unit 114, an operation for moving the slider 176 in the negative x-axis direction by one notch, the reference point in time is changed to a point in time after the electronic sticky note 171 is added and before the electronic seal 172 is attached. Accordingly, the preview image 170 representing the business trip application form in the second format is changed to a state in which attachment of the electronic seal 172, which was performed after the reference point in time, returns to the state before being edited, that is, a state in which the electronic sticky note 171 is added but the electronic seal 172 is not attached. In this case, as illustrated in FIG. 7, the electronic seal 172 and the additional image 174 are deleted from the preview image 170.

In contrast, for example, in the case where an operation for selecting the icon 162 is performed on the preview screen 160 illustrated in FIG. 6 in step S15 described above, because the business trip application form manual corresponding to the icon 162 was displayed but was not edited in the last business trip application task as described above, the result of the determination in step S15 is NO. In this case, the process proceeds to step S17.

In step S17, the processor 111 generates a second preview image of data corresponding to the icon selected in step S14. The second preview image is an image representing data displayed in the last target task. Additional information is added to a part in the second preview image whose display duration in the last target task is equal to or more than a threshold.

Figure 8:
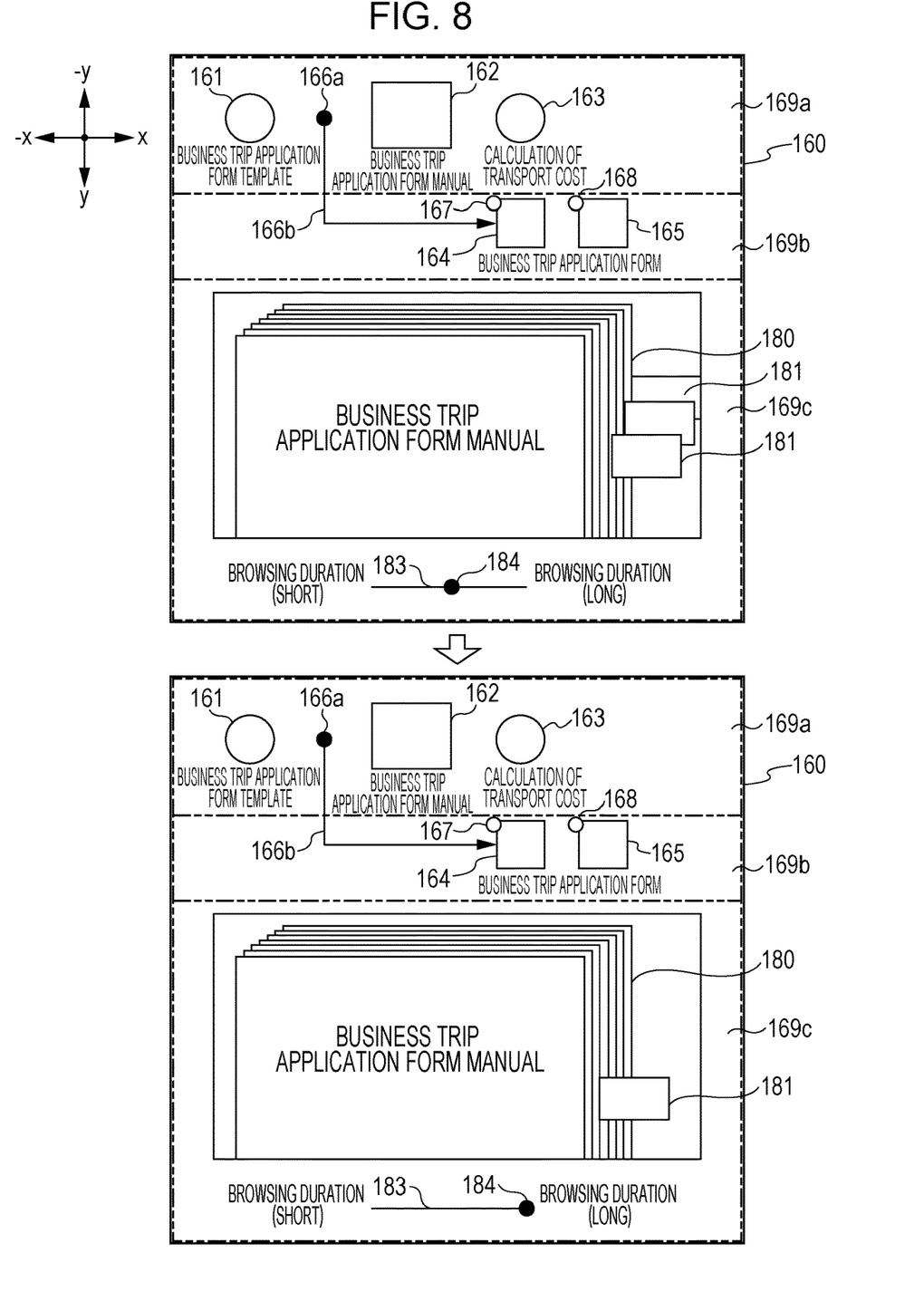
FIG. 8 is a diagram illustrating an example of a preview image of a business trip application form manual.

In this example, it is assumed that the icon 162 representing the business trip application form manual is selected. In this case, a preview image 180 representing the business trip application form manual is generated. Because the business trip application form manual contains a plurality of pages, the preview image 180 also contains a plurality of pages. Furthermore, the operation history 117 illustrated in FIG. 3 indicates display duration of individual pages of the business trip application form manual. An electronic sticky note 181 is added to a page of the business trip application form manual in the preview image 180 whose display duration is equal to or more than a threshold. For example, in the case where the threshold is ten seconds, the electronic sticky note 181 is added to a page whose display duration is equal to or more than ten seconds. For example, the threshold is set to a duration during which the user is thought to read contents.

In this case, in step S18 described above, the preview image 180 generated in step S17 is displayed.

FIG. 8 is a diagram illustrating an example of the preview image 180 of the business trip application form manual. The preview image 180 is displayed in the region 169c of the preview screen 160. In the default state, the preview image 180 represents the first page of the business trip application form manual. When the user performs, using the operation unit 114, an operation for turning pages, the preview image 180 representing a different page of the business trip application form manual is displayed. Furthermore, the electronic sticky note 181 is added to a page of the business trip application form manual in the preview image 180 whose display duration is equal to or more than ten seconds. With addition of the electronic sticky note 181, a page whose display duration is equal to or more than the threshold is highlighted.

Furthermore, an operation image 183 to be used for an operation for changing the threshold is displayed, along with the preview image 180, in the region 169c. When the user performs an operation for changing the threshold on the operation image 183, additional information based on the changed threshold is added again. The operation image 183 is, for example, a slider bar. The operation image 183 includes a slider 184. The threshold decreases when an operation for moving the slider 184 in the negative x-axis direction is performed, and the threshold increases when an operation for moving the slider 184 in the x-axis direction is performed. Scales of the operation image 183 may be set in advance or may be set in accordance with an operation by the user. For example, to increase the threshold, the user performs, using the operation unit 114, an operation for moving the slider 184 in the x-axis direction, as illustrated in FIG. 8. In accordance with this operation, the threshold increases. For example, the threshold is changed from ten seconds to twenty seconds. In this case, for example, after the electronic sticky note 181 is temporarily deleted, the electronic sticky note 181 is added to a page whose display duration is equal to or more than twenty seconds. In general, the number of electronic sticky notes 181 decreases as the threshold increases. By viewing the new electronic sticky note 181, the user is able to understand a page whose display duration is equal to or more than twenty seconds.

In step S19, the processor 111 determines whether or not an instruction for outputting data has been issued. This determination is made in accordance with, for example, whether or not the user has issued, using the operation unit 114, an instruction to output data. In the case where the instruction for outputting data has not been issued, the process ends. In contrast, in the case where the instruction for outputting data has been issued, the processor 111 outputs the designated data to the processor 111. For example, in the case where an operation for issuing an instruction for outputting data is performed while the preview image 170 illustrated in FIG. 7 is being displayed, the business trip application form in the second format in the state represented by the preview image 170 is displayed on the display 115. In the case where an operation for issuing an instruction for outputting data is performed while the preview image 170 in the state after the electronic sticky note 171 is added and before the electronic seal 172 is attached is being displayed, the business trip application form in the second format in the state in which the electronic sticky note 171 is added but the electronic seal 172 is not attached is displayed on the display 115. Accordingly, the user is able to reuse the business trip application form in the second format in the processing for applying for a business trip. For example, the user may attach a new electronic seal indicating the current date to the business trip application form in the second format in the processing for the business trip application task.

According to an exemplary embodiment described above, the icons 161 to 165 representing data that the user used in the last target task are arranged and displayed in an order corresponding to display date and time or editing date and time. Thus, the user is able to recognize the data that the user used when the user performed the last target task and the procedure for using the data.

Furthermore, the icons 164 and 165 representing data that were edited in the last target task are arranged and displayed in an order corresponding to editing date and time of the data. Thus, the user is able to recognize the data that the user edited when the user performed the last target task and the procedure for editing. Moreover, the additional images 173 and 174 are added to parts in the preview image 170 that were edited in the last target task. Thus, compared to the case where only data obtained by editing in the last target task are displayed, the user is able to easily recognize parts on which editing was made. Furthermore, when the user performs an operation for specifying a reference point in time on the operation image 175, data in which a part that was edited after the reference point in time returns to a state before being edited is output. Thus, the user is able to perform the target task using data in a state in which editing history goes back to a desired point in time. Furthermore, the additional images 167 and 168 are added to the icons 164 and 165 representing data edited in the last target task. Thus, compared to the case where an image representing data that was edited in the last target task and an image representing data that was displayed without being edited in the last target task are displayed without being distinguished from each other, the user is able to easily recognize the image representing the edited data.

Furthermore, the icons 161 to 163 representing data that were displayed without being edited in the last target task are arranged and displayed in an order corresponding to display date and time of the data. Thus, the user is able to recognize the data that the user browsed when the user performed the last target task and the procedure for browsing the data. Moreover, the electronic sticky note 181 is added to a page in the preview image 180 whose display duration in the last target task is equal to or more than the threshold. Thus, compared to the case where only data that was browsed in the last target task is displayed, the user is able to easily recognize a part that the user browsed for a duration equal to or more than the threshold. Furthermore, when the user performs an operation for changing the threshold on the operation image 183, the electronic sticky note 181 is added again in accordance with the changed threshold. Thus, a part to which additional information is added may be changed to a part that the user browsed for a desired duration or more.

3. Modification

An exemplary embodiment described above is an example of an exemplary embodiment of the present disclosure. The present disclosure is not limited to the exemplary embodiment described above. The exemplary embodiment described above may be modified as described below. Two or more modifications may be combined together.

In an exemplary embodiment described above, a page represented by the preview image 180 in the default state is not necessarily the first page. For example, a page represented by the preview image 180 may be a page whose display duration is the longest. In this modification, the user is able to browse a page with the longest display duration without performing an operation for turning pages.

In an exemplary embodiment described above, in accordance with an operation for selecting one of the icons 161 to 165, a preview image representing target data represented by the selected icon and a preview image representing different data with the display date and time overlapping with the display date and time of the target data may be displayed. In this case, the display date and time represents, for example, a period during which data was displayed. For example, the operation history 117 illustrated in FIG. 3 indicates that the business trip application form in the first format, the business trip application form manual, and the web page for calculation of transport cost were displayed in this order. In the case where the business trip application form in the first format, the business trip application form manual, and the web page for calculation of transport cost were displayed together in the last business trip application task, a preview image of the business trip application form in the first format, a preview image of the business trip application form manual, and a preview image of the web page for calculation of transport cost may be displayed together on the same screen. These preview images may be displayed in different windows. In this modification, the user is able to browse the target data and the different data that were displayed along with the target data in the last target task.

In an exemplary embodiment described above, the additional images 173 and 174 are not necessarily added to edited parts in the preview image 170. The preview image 170 may be displayed in any display format as long as an edited part is highlighted in the display format. For example, an edited part may be displayed in a color standing out or may be surrounded by a frame.

In an exemplary embodiment described above, only the icons 164 and 165 representing edited data out of data the user used in the last target task may be displayed on the preview screen 160. For example, there may be a display mode in which the icons 161 to 165 representing data that were used in the last target task are displayed and a display mode in which only the icons 164 and 165 representing edited data out of the data that were used in the last target task. In this case, the display mode may be switched in accordance with an operation by the user. In the case where only the icons 164 and 165 representing edited data are displayed, for example, when an operation for selecting the icon 165 is performed, a preview image of data displayed while the business trip application form in the second format was being edited may be displayed. The preview image may be displayed, for example, on a pop-up screen. Furthermore, in the case where a plurality of pieces of data were displayed while the business trip application form in the second format was being edited, the preview images of the data may be displayed together or may be displayed in a switching manner.

In an exemplary embodiment described above, color of the electronic sticky note 181 added to the preview image 180 may be changed according to the display duration of a corresponding page. For example, color of the electronic sticky note 181 added to a page becomes darker as the display duration of the page increases.

In an exemplary embodiment described above, the icons 161 to 163 and the icons 164 and 165 are not necessarily displayed along different lines. For example, the icons 161 to 163 and the icons 164 and 165 may be displayed in the same line.

In an exemplary embodiment described above, designs of the icons 161 to 165 may be different according to the file format of corresponding data. For example, the icon 161 and the icon 163 corresponding to web data may have the same design. In contrast, the icon 162 corresponding to the business trip application form manual, the icon 164 corresponding to the business trip application form in the first format, and the icon 165 corresponding to the business trip application form in the second format may have different designs. In this modification, only by viewing the icons 161 to 165, the user is able to understand the file format of corresponding data.

In an exemplary embodiment described above, data itself may be used instead of the preview image 170 or 180.

In an exemplary embodiment described above, the operation history 117 is not necessarily stored in the client apparatus 110. The operation history 117 may be stored in an apparatus different from the client apparatus 110. In this case, the client apparatus 110 acquires the operation history 117 from the different apparatus and uses the acquired operation history 117.

In an exemplary embodiment described above, a task performed by the user using data is not limited to a business trip application task. The user may perform a task different from the business trip application task, using data in accordance with a fixed workflow. Furthermore, a target that the user performs using data is not necessarily a task. Any operation may be performed as long as the operation is performed using data.

In an exemplary embodiment describe above, a subject of a process of the task support system 100 is not limited to an example describe above in an exemplary embodiment. For example, at least part of a process performed by the client apparatus 110 may be performed by a different apparatus.

The present disclosure may be provided as a program to be executed by the client apparatus 110. The client apparatus 110 is an example of a computer according to an exemplary embodiment of the present disclosure. This program may be downloaded via a communication line such as the Internet or may be recorded in a computer-readable recording medium such as a magnetic recording medium (a magnetic tape, a magnetic disk, etc.), an optical recording medium (an optical disc etc.), a magneto-optical recording medium, or a semiconductor memory and provided.

In the embodiments above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
   acquire operation history of data used in a target operation;
   arrange and display icons representing the data in accordance with a chronological order represented by the operation history on a display, wherein
   the data includes first data and second data edited in the target operation, and
   the operation history includes an editing date and time of the first data;
   arrange and display first icons representing the first data in a first chronological order corresponding to the editing date and time, wherein
   the operation history includes a display date and time of the second data;
   arrange and display second icons representing the second data on the display in a second chronological order corresponding to the display date and time; and
   display the second icons in a region different from a region in which the first icons are displayed.

2. The information processing apparatus according to claim 1,
   wherein the operation history includes editing history of the first data, and
   wherein in accordance with an operation for selecting one of the first icons, the processor displays corresponding first data on the display in a display format in which an edited part represented by the editing history is highlighted.

3. The information processing apparatus according to claim 2,
   wherein the editing history includes history of a plurality of editing processes, and
   wherein the processor is configured to:
   display an operation image used for an operation for specifying a reference point in time included in a period during which the plurality of editing processes are performed on the display; and
   display, when the operation for specifying the reference point in time is performed on the operation image, the first data such that a part that was edited after the reference point in time represented by the editing history returns to a state before being edited.

4. The information processing apparatus according to claim 1,
   wherein the processor displays second icons representing the second data in a manner distinguished from the first icons.

5. The information processing apparatus according to claim 2,
   wherein the processor displays second icons representing the second data in a manner distinguished from the first icons.

6. The information processing apparatus according to claim 3,
   wherein the processor displays second icons representing the second data in a manner distinguished from the first icons.

7. The information processing apparatus according to claim 5,
   wherein the operation history includes display duration of the second data, and
   wherein in accordance with an operation for selecting one of the second icons, the processor displays corresponding second data in which additional information is added to a part whose display duration is equal to or more than a threshold on the display.

8. The information processing apparatus according to claim 5,
   wherein the operation history includes display duration of the second data, and
   wherein in accordance with an operation for selecting one of the second icons, the processor displays corresponding second data in which additional information is added to a part whose display duration is equal to or more than a threshold on the display.

9. The information processing apparatus according to claim 6,
   wherein the operation history includes display duration of the second data, and wherein in accordance with an operation for selecting one of the second icons, the processor displays corresponding second data in which additional information is added to a part whose display duration is equal to or more than a threshold on the display.

10. The information processing apparatus according to claim 7,
wherein the processor is configured to:
display an operation image used for an operation for changing the threshold on the display; and
add, when the operation is performed on the operation image, the additional information based on the changed threshold again.

11. The information processing apparatus according to claim 7,
wherein the second data includes a plurality of pages, and
wherein in accordance with the operation for selecting one of the second icons, the processor displays a page with a longest display duration out of the plurality of pages.

12. The information processing apparatus according to claim 1,
wherein the data includes a plurality of pieces of data,
wherein the operation history includes display date and time of the plurality of pieces of data, and
wherein the processor is configured to:
display a plurality of icons representing the plurality of pieces of data on the display; and
display, in accordance with an operation for selecting any one of the plurality of icons, target data represented by the selected icon and different data whose display date and time overlaps with the display date and time of the target data, out of the plurality of pieces of data, on the display.

13. A non-transitory computer readable medium storing a program causing a computer to execute a process for information processing, the process comprising:
acquiring operation history of data used in a target operation;
arranging and displaying icons representing the data in accordance with a chronological order represented by the operation history on a display, wherein
the data includes first data and second data edited in the target operation, and
the operation history includes an editing date and time of the first data;
arranging and displaying first icons representing the first data in a first chronological order corresponding to the editing date and time, wherein
the operation history includes a display date and time of the second data;
arranging and displaying second icons representing the second data on the display in a second chronological order corresponding to the display date and time; and
displaying the second icons in a region different from a region in which the first icons are displayed.

* * * * *